United States Patent
Moore

[19]

[11] Patent Number: 6,107,114
[45] Date of Patent: Aug. 22, 2000

[54] PROCESS FLOW OPTIMIZED TO PROTECT REFLECTANCE OF SILICON LIGHT VALVE

[75] Inventor: Paul McKay Moore, San Bruno, Calif.

[73] Assignee: National Semiconductor Corporation, Santa Clara, Calif.

[21] Appl. No.: 09/195,406

[22] Filed: Nov. 19, 1998

[51] Int. Cl.$^7$ .................................................. H01L 21/00
[52] U.S. Cl. ................................ 438/48; 438/48; 438/64; 438/67; 257/440; 257/444
[58] Field of Search ................................ 438/48, 49, 60, 438/66, 67, 68, 69, 70; 257/438, 439, 440, 441, 442

[56] References Cited

U.S. PATENT DOCUMENTS

| | | | |
|---|---|---|---|
| 4,185,894 | 1/1980 | Hilton et al. | 350/338 |
| 4,999,619 | 3/1991 | Velde | 340/784 |
| 5,258,325 | 11/1993 | Spitzer | 437/86 |
| 5,376,561 | 12/1994 | Vu et al. | 437/31 |
| 5,422,299 | 6/1995 | Neudeck et al. | 437/63 |
| 5,473,448 | 12/1995 | Yoshinaga et al. | 359/51 |
| 5,511,428 | 4/1996 | Goldberg et al. | 73/777 |
| 5,539,550 | 7/1996 | Spitzer et al. | 359/59 |
| 5,702,963 | 12/1997 | Vu et al. | 437/41 |
| 5,706,067 | 1/1998 | Colgan et al. | 349/114 |
| 5,764,324 | 6/1998 | Lu et al. | 349/113 |
| 5,771,321 | 6/1998 | Stern | 385/31 |
| 5,838,715 | 11/1998 | Corzine et al. | 372/96 |

OTHER PUBLICATIONS

Colgan, E.G., et al., "On–Chip Metallization Layers for Reflective Light Valves", IBM J. Res. Develop. vol. 42 No. 3/4 May/Jul. 1998, pp. 339–345.

Takayama, S., et al., "Effects of Y or Gd Addition on the Structures and Resistivities of Al Thin Films", J. Vac. Sci. Technol. A 14(4), Jul./Aug. 1996, pp. 2499–2504.

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'Hara, A., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, p. 277280.

*Primary Examiner*—Charles Bowers
*Assistant Examiner*—Laura M Schillinger
*Attorney, Agent, or Firm*—Limbach & Limbach L.L.P.

[57] ABSTRACT

Reflectance of a silicon light valve is preserved by eliminating bowing in the wafer and by retaining the pad etch photoresist mask on the wafer until insertion of LC material. Wafer bowing is eliminated by performing backside etching to remove polysilicon and oxide accumulated during previous polysilicon deposition steps. The pad etch photoresist mask serves as passivation during wafer transport and testing before liquid crystal material is inserted. The pad etch photoresist mask is removed during the cleaning step that is required prior to insertion of LC material. Elimination of the redundant pad etch photoresist mask stripping step spares the metal electrodes of the precursor light valve structure from roughness and loss of reflectance that would be caused by the extra cleaning step.

19 Claims, 7 Drawing Sheets

Diametric Variation = 61.16 UMTR
Rotation Angle = 90.0 DEG

FIG. 4B

Diametric Variation = 4.20 UMTR
Rotation Angle = 90.0 DEG

FIG. 4C

Diametric Variation = 86.74 UMTR
Rotation Angle = 90.0 DEG

FIG. 4D

Diametric Variation = 31.82 UMTR
Rotation Angle = 90.0 DEG 6,107,114

PROCESS FLOW OPTIMIZED TO PROTECT REFLECTANCE OF SILICON LIGHT VALVE

BACKGROUND OF THE INVENTION

1. Field of the Invention

The present invention relates to a process for forming a reflective light valve, and, in particulars to a process for forming a reflective light valve that substantially removes wafer bowing that can degrade light valve performance.

2. Description of the Related Art

Liquid crystal displays (LCDs) are becoming increasingly prevalent in high-density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which, depending upon the image to be projected, either permits or prevents transmission of light therethrough. Those RGB bands of light which are permitted to be transmitted through the light valves are then recombined by dichroic mirrors or a prism. A projection lens then magnifies the recombined light bands and projects the image onto a projection screen.

Figure 1:
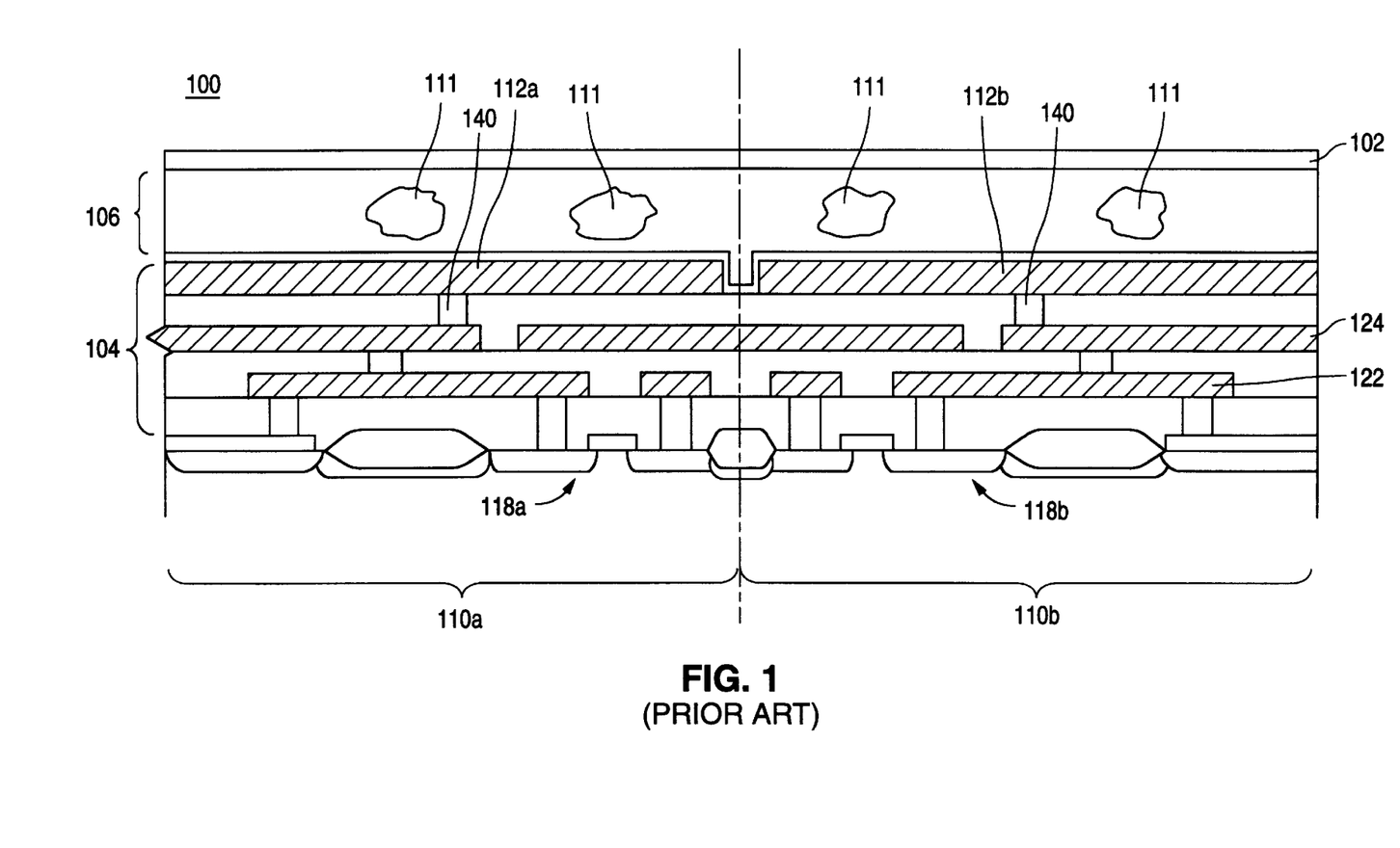
FIG. 1 is a cross-sectional view illustrating adjacent pixel cell structures that form a portion of a conventional light valve.

FIG. 1 illustrates a cross-sectional view of adjacent pixel cell structures that form a portion of a conventional light valve. Portion 100 of the conventional light valve includes a glass top plate 102 bonded to an interconnect structure 104 by a sealing member (not shown). The sealing member serves to enclose a display area and to separate glass plate 102 from interconnect 104 by a predetermined minute distance. Thus, the light valve has a cell gap 106 defined by the glass plate 102 and interconnect 104. Liquid crystal material 111, such as polymer dispersed liquid crystal (PDLC), is sealed in cell gap 106.

In a reflective mode display technology, an image is generated by creating regions within the light valve having differing contrast. This contrast is created by the state of the liquid crystal material above the reflective surface, which in turn regulates the amount of light passing from the ambient to the reflective surface.

During operation of the light valve shown in FIG. 1, selective application of voltage to pixel electrodes 112a and 112b from underlying capacitor structures 118a and 118b (through metallization 122 and 124 and via 140) switches pixel cells 110a and 110b on and off. Voltage applied to pixel electrodes 112a and 112b varies the direction of orientation of the liquid crystal material overlying the pixel electrode. A change in the direction of orientation of the liquid crystal material at the pixel electrode changes the optical characteristics of the light traveling through the liquid crystal.

If the light valve contains twisted nematic crystal, light passes through the light valve unchanged when no voltage is applied to the pixel electrode, and the light is polarized if a voltage is applied to the pixel electrode. If the light valve contains PDLC, light passes through the light valve unchanged when a voltage is applied to the pixel electrode, and light is scattered if no voltage is applied to the pixel electrode.

One key attribute of light valve performance is the amount of light reflected by the pixel cell. The degree of reflectance of the pixel cell in turn affects other system attributes such as contrast ratio, pixel coherence and brightness efficiency.

One approach to enhancing the performance of any reflective mode light valve is to increase the reflectance of the pixel electrode toward the ideal. The process for achieving maximum attainable reflectance is described in U.S. patent application Ser. No. 09/136,627, filed Aug. 19, 1998 and entitled "Silicon Interconnect Passivation and Metallization Process Optimized to Maximize Reflectance." Briefly, this process flow is optimized to eliminate and prevent roughness in the metal pixel electrode layer caused by processing that occurs after deposition of the metal pixel electrode layer.

One process that can lead to degraded reflectance in a light valve is stripping of photoresist layers that cover the pixel electrodes during fabrication of the light valve. This stripping is performed utilizing a plasma ash. The harsh conditions of the plasma ash may etch or roughen the surface of the metal pixel electrode, reducing its reflectance.

Therefore, there is a need in the art for a process flow for forming a silicon light valve that minimizes exposure of the pixel electrode to plasma ash processing steps.

A second processing step that can degrade reflectance of a pixel cell of a light valve is the deposition of polysilicon. During fabrication of the light valve, a number of polysilicon deposition steps are ordinarily performed. These poly deposition steps include formation of polysilicon elements of the capacitor structures 118a and 118b shown in FIG. 1, which control activation of the various individual pixel cells of the array.

Because polysilicon may be deposited on both sides of a wafer during deposition, one consequence of polysilicon deposition is accumulation of polysilicon on the backside of the wafer. The compressive force exerted by the backside polysilicon can cause the wafer to bow. The resulting distortion in wafer shape can degrade the reflectance of the light valve by creating a cell gap of varying width between the reflective electrode and the top glass plate. Such a nonuniform cell gap can give rise to unwanted interference fringes due to the uneven path length traversed by incident light.

Therefore, there is a need in the art for a process flow for forming a silicon light valve that minimizes the bow in the wafer bearing the silicon light valve, thereby ensuring a uniform cell gap.

SUMMARY OF THE INVENTION

The present invention provides a process for forming a silicon light valve that retains the pad etch photoresist layer for testing and transport of the wafers, and which also etches backside polysilicon to eliminate bowing of the wafer. By retaining the pad etch photoresist layer through wafer transport and testing, the reflective pixel electrode is spared a plasma etch step that would otherwise be necessary to strip this resist mask. By etching backside polysilicon and thereby removing bow in the wafer, the cell gap between the top translucent plate and the metal electrode of the pixel cell is maintained constant.

A process flow in accordance with one embodiment of the present invention comprises the steps of forming polysilicon on a front side and a back side of a semiconductor wafer, etching the polysilicon on the front side of the wafer to create polysilicon elements of a precursor light valve structure whereby polysilicon on the backside of the wafer causes a bow in the wafer, forming a pad etch photoresist mask on the front side of the semiconductor wafer, removing the polysilicon on the backside of the wafer whereby the bow in the wafer is substantially eliminated, etching regions of the precursor light valve structure unmasked by the pad etch photoresist mask to form pad etch regions, and removing the pad etch photoresist mask immediately prior to inserting liquid crystal material into the precursor light valve structure.

The features and advantages of the present invention will be better understood upon consideration of the following detailed description of the invention and the accompanying drawings.

DETAILED DESCRIPTION OF THE INVENTION

The present invention relates to a process flow for forming a reflective light valve, and, in particular, to a process flow for forming a reflective light valve which substantially removes bowing in a silicon wafer and which subjects the metal pixel electrode to a minimum of photoresist stripping steps.

Figure 2A:
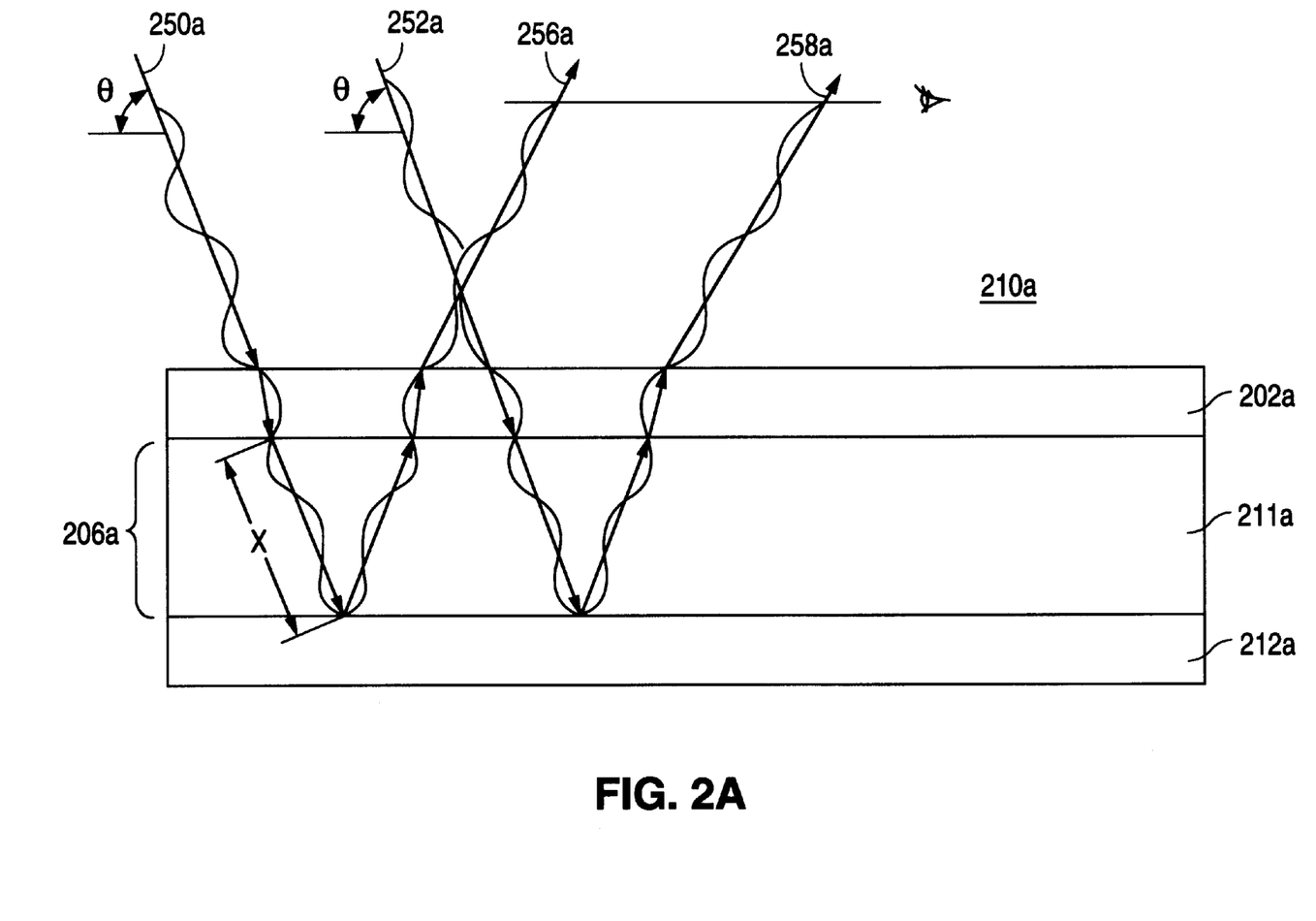
FIGS. 2A–2B are cross-sectional views illustrating the effect of wafer bow upon the reflectance exhibited by a light valve.
Figure 2B:
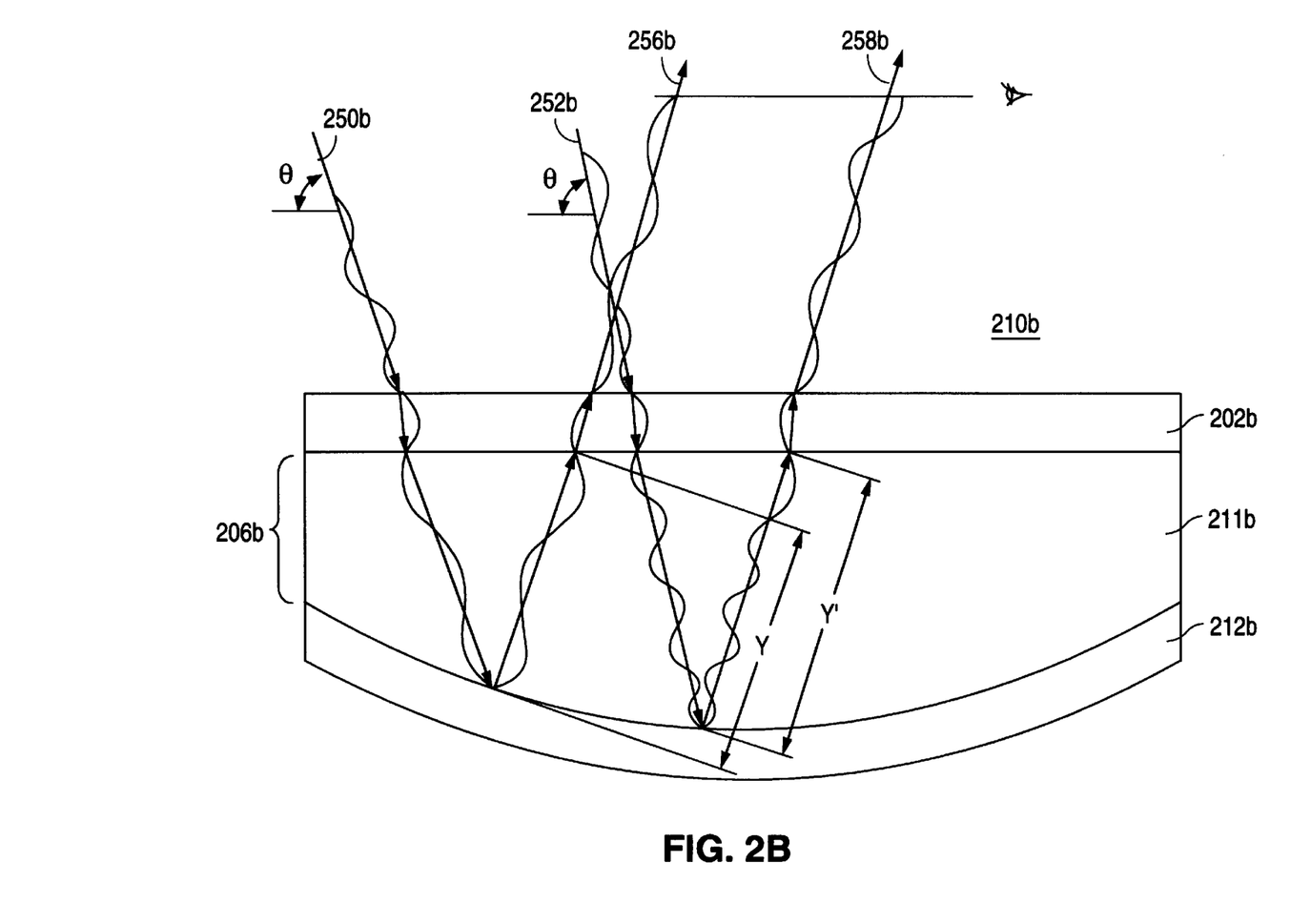

FIGS. 2A–2B are cross-sectional views of the pixel electrode, LC material, and top plate that illustrate the deleterious effect of wafer bowing upon reflectance. FIG. 2A shows a portion 210a of a light valve including liquid crystal material 211a sandwiched between translucent top plate 202a and metal pixel electrode 212a. Metal pixel electrode 212a is substantially planar due to an absence of bowing in the underlying wafer.

Light rays 250a and 252a have the same angle of incidence ($\theta$) to the light valve. Incident light rays 250a and 252a also have the same phase angle. As shown in FIG. 2A, incident light rays 250a and 252a both first pass through translucent top layer 202a and are refracted. Rays 250a and 252a then continue into the liquid crystal material 211a positioned within cell gap 206a. In FIG. 2A, it is important to note that due to the planarity of the metal pixel electrode 212a, the width of cell gap 206a is uniform over the length of the pixel cell.

Light rays 250a and 252a then traverse the same path length "X", and are reflected by pixel electrode 212a. Reflected light rays 256a and 258a then re-traverse path length X, and are transmitted back through translucent top layer 202a as visual output of the light valve. Again, because reflected rays 256a and 258a were originally in-phase and have traversed the same path length X, they are also emitted from the pixel cell in phase and provide a clear image to an observer Contrast FIG. 2A with the reflective properties of the bowed pixel cell depicted in FIG. 2B. FIG. 2B shows a portion 210b of a light valve including liquid crystal material 211b sandwiched between translucent top plate 202a and metal pixel electrode 212b. Metal pixel electrode 212b is not substantially planar due to negative bowing in the underlying wafer.

Light rays 250b and 252b have the same angle of incidence ($\theta$) to the light valve. Incident light rays 250b and 252b also have the same phase angle. As shown in FIG. 2B, incident light rays 250b and 252b both first pass through translucent top plate 202b and are refracted. These rays then continue into the liquid crystal material 211b positioned within cell gap 206b.

In FIG. 2B, it is important to note that due to the negative bowing of the metal pixel electrode 212b, the width of cell gap 206b varies significantly over the length of the pixel cell. Due to this nonplanarity of pixel electrode 212b, light rays 250b and 252b then traverse path lengths Y and Y' respectively and are reflected by pixel electrode 212b. Reflected light rays 256b and 258b then retraverse path lengths Y and Y' respectively and are transmitted back through translucent top layer 202b as visual output of the light valve.

While the incident light rays 250b and 252b were originally in phase with one another, because of the nonplanarity of the pixel electrode they have covered different path lengths (2Y and 2Y' respectively) during their passage through cell gap 206b. This results in a change in phase angle of reflected light ray 256b relative to reflected light ray 258b.

This changed phase angle generates constructive or destructive interference between reflected light rays 256b and 258b. This interference is perceived as a series of light and dark fringes more commonly known as "Newton's rings." These fringes can significantly degrade the quality of any image produced by the pixel cell.

Because of the loss of image quality associated with nonplanarity in the underlying pixel electrode, the present invention proposes a flow of processing steps that eliminates bowing in the underlying wafer. FIGS. 3A-3G are perspective views of a silicon wafer undergoing a series of processing steps in accordance with the present invention.

Figure 3A:
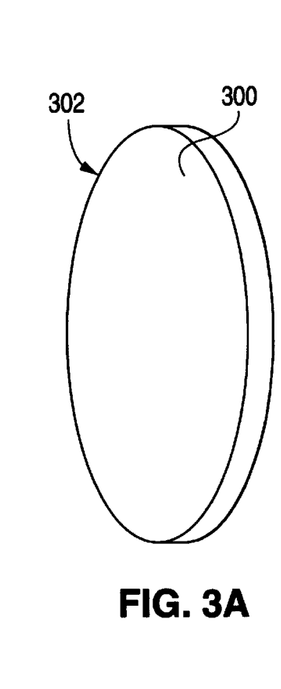
FIGS. 3A–3G are perspective views illustrating the processing steps in accordance with one embodiment of the present invention.
Figure 3B:
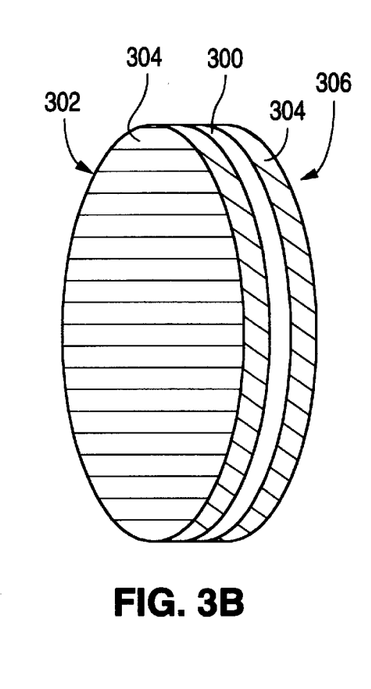

FIG. 3A shows front side 302 of wafer 300 prior to the performance of any polysilicon deposition steps. FIG. 3B shows a polysilicon deposition step, wherein polysilicon 304 coats both front side 302 and back side 306 of wafer 300.

Figure 3C:
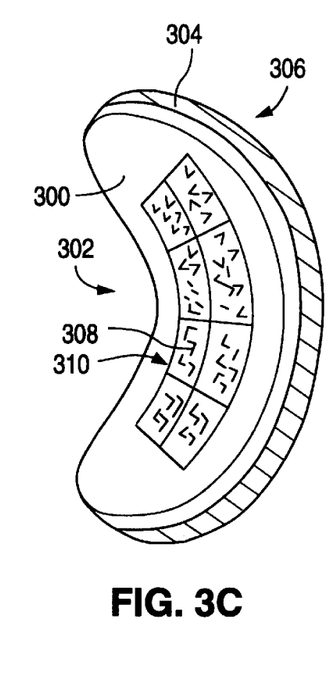

FIG. 3C shows the etching of polysilicon 304 on the front side 302 of wafer 300. As a result of this etching, polysilicon features 308 are created on chips 310 of wafer 300.

Much of the mass of the polysilicon layer 304 on the front side of wafer 302 is removed during the etching step shown in FIG. 3C. As a consequence of imbalance between the mass of polysilicon present on the front side of the wafer versus the back side of the wafer, the wafer 300 is bowed. This bowing is due to the compressive force exerted by polysilicon layer 304 on the backside 306 of wafer 300.

For the purposes of illustration, the magnitude of this wafer bowing is greatly exaggerated in FIG. 3C. However, while the magnitude of bowing experienced by wafer 300 may vary with the thickness of backside polysilicon layer 304, the direction of bowing (with the outside edges moving away from the polysilicon) should remain the same, as less polysilicon always remains on the front side of the wafer. By convention. bowing in this direction is deemed a negative quantity.

After the first polysilicon deposition step, a large number of processing steps are commonly necessary to complete fabrication of the precursor light valve structure. This subsequent processing may include additional polysilicon deposition steps.

Figure 3D:
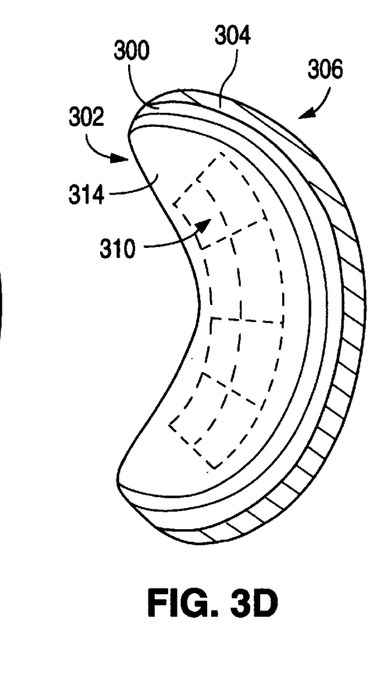

Once fabrication of the precursor light valve structure is completed, pads must be etched to allow external connection of the chips 310 to the outside world. FIG. 3D shows wafer 300 bearing pad etch photoresist coating 314.

Figure 3E:
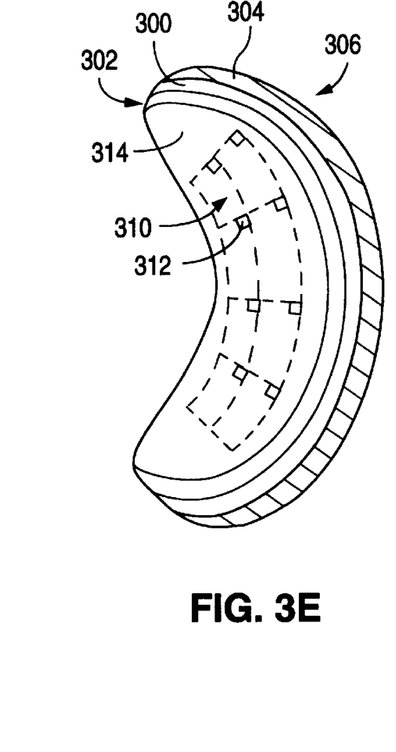

FIG. 3E shows development of pad etch photoresist coating 314, followed by etching to expose pad regions 312 of wafer 300.

Figure 3F:
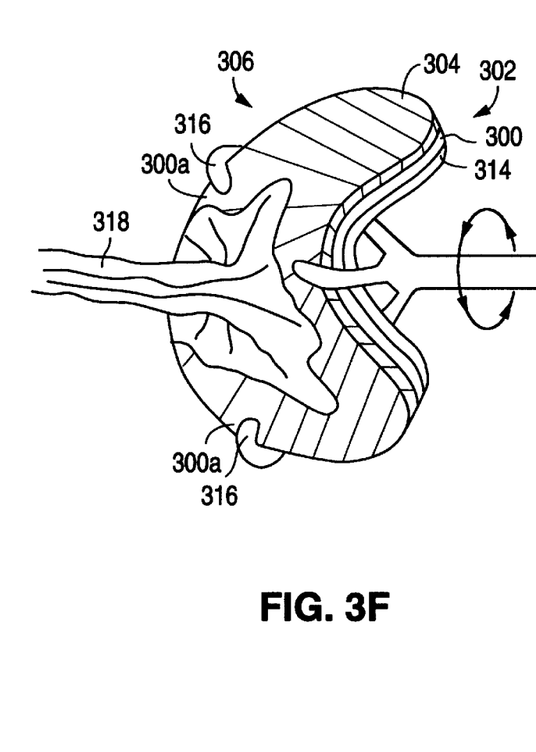

FIG. 3F shows removal of the polysilicon layer 304 present on the backside 306 of wafer 300. Backside polysilicon removal is accomplished by use of a special tool, such as a spinning etcher. One example of this type of device is the SEZ Model RST201 backside etcher, manufactured by SEZ Corporation of Phoenix, Ariz.

A spinning etcher such as the SEZ RST201 operates by first grasping and securing wafer 300 at edges 300a with Teflon fingers 316. The device then spins wafer 300, and then sprays etchant 318 onto the backside 306 of wafer 300. The centrifugal force throws etchant 318 away from the center of the wafer 300, thus preventing etchant 318 from etching unprotected front side 302 of the wafer 300. In this manner, pad regions 312 exposed during the previous pad etch step shown in FIG. 3E are protected from exposure to etchant 318.

Removal of backside polysilicon utilizing a backside etcher such as the SEZ RST201 in accordance with the present invention is actually a multi-step process. This is because once polysilicon has formed on the backside of the wafer, the polysilicon ordinarily reacts with oxygen to form silicon oxide.

This oxidation occurs after each deposition step, creating multiple backside oxide layers. Because the etch susceptibility of silicon oxide differs significantly from that of polysilicon, multiple etching steps must be utilized to remove accumulated backside polysilicon and the oxide coating.

For example, the SEZ RST201 employs the following process sequence to remove the oxide coating over the backside polysilicon. First, the wafer is spun at 750 RPM for 10 sec. at a temperature of 55° C. while an etchant composed of an aqueous solution of 49% HF is applied to the wafer backside. Next, the wafer is spun at 1000 RPM for 14 sec. at ambient temperature while being rinsed with DI water. Finally, the wafer is dried by being spun at 1500 RPM for 12 sec. at ambient temperature in an $N_2$ atmosphere.

To remove the backside polysilicon exposed by the previous steps, the RST201 spins the wafer at 750 RPM for 3 sec. at a temperature of 27° C. while a 10:1 mixture of 70% nitric acid and 49% HF is applied to the wafer backside This etching step is then repeated under the same conditions for 4 sec. Next, the wafer is spun at 1000 RPM for 10 sec. at ambient temperature while being rinsed with DI water. Finally, the wafer is dried by being spun at 1500 RPM for 12 sec. at ambient temperature in an $N_2$ atmosphere.

It is important to note that the above backside etching sequence for both oxide and polysilicon is required for each previous polysilicon deposition step. This is because the oxide coating will form after each polysilicon layer is formed.

Figure 3G:
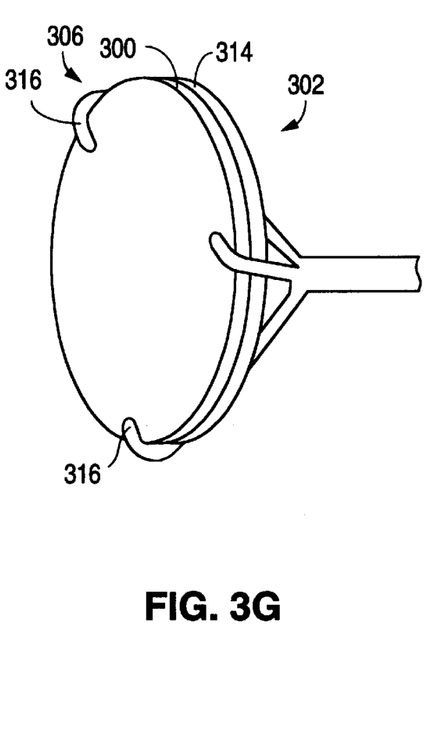

FIG. 3G shows wafer 300 after completion of backside etching. Polysilicon has been removed from backside 306 of wafer 300. Because the backside polysilicon is now gone, no compressive force is exerted on the wafer. Wafer 300 thus assumes a substantially planar profile.

FIGS. 4A–4D are wafer bow measurements that show the beneficial results of removal of backside polysilicon in accordance with one embodiment of the present invention. The bow measurements shown in FIGS. 4A–4D were taken with the ADE 9500 UltraGage, manufactured by ADE Corporation of Newton, Mass.

The ADE 9500 measures bow, warp, and thickness of the wafer at predetermined locations across a spinning sample. A wafer is loaded from a cassette via a robot arm. The wafer is then centered on the chuck, which then spins the wafer during the measurement process. To measure at the center of the wafer, the chuck repositions itself to an offcentered position. The chuck then rotates and moves the wafer left and right. Electrodes present above and below the wafer (normal to the surface) provide an electric field while the sample is in motion, providing a way of determining the capacitance as a function of the air gap between the wafer and the electrode. Next, the thickness, bow, and warp are inferred from the value of the capacitance recorded at any predetermined location across the wafer.

The wafers shown in FIGS. 4A–4D were subjected to two separate polysilicon deposition steps. FIGS. 4A–4D indicate that removal of polysilicon from the wafer's backside will substantially eliminate bowing in the wafers.

Figure 4A:
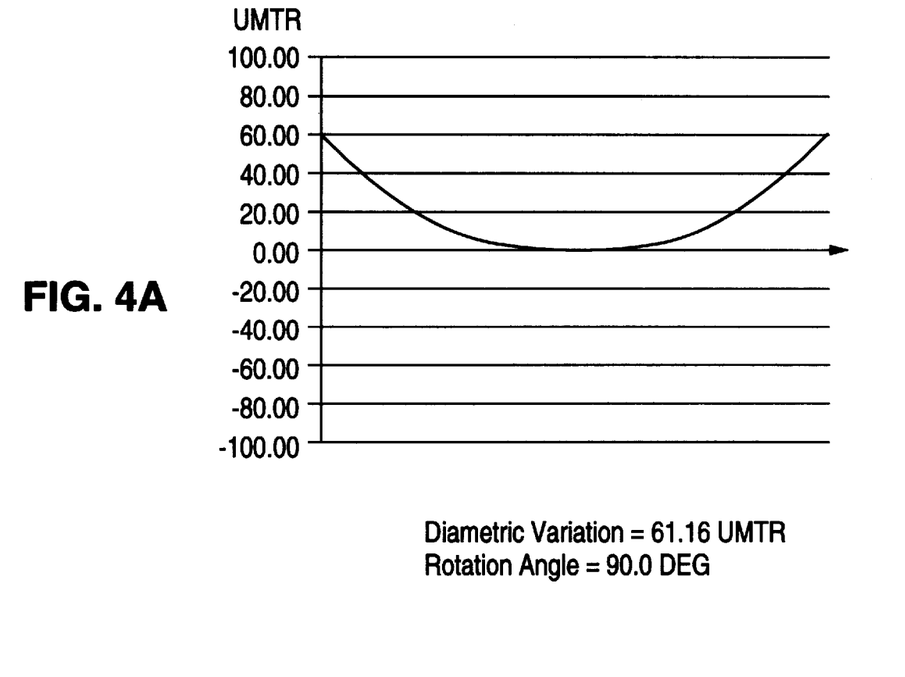
FIGS. 4A–4D are wafer bow measurements that show the beneficial results of backside polysilicon removal in accordance with one embodiment of the present invention.
Figure 4B:
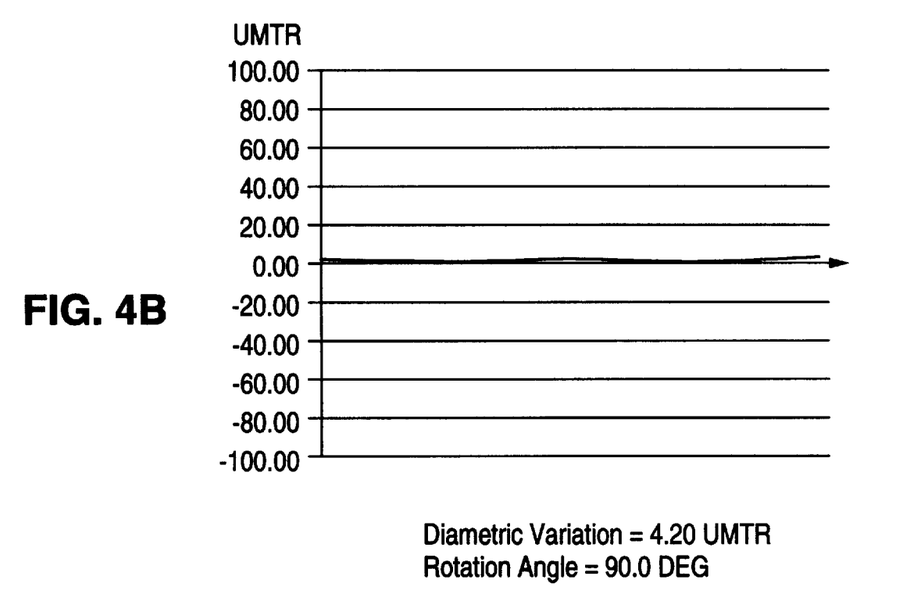

FIG. 4A shows bow measurement of a first wafer prior to backside polysilicon etching in accordance with the present invention. FIG. 4B shows bow measurement of the same lot following backside polysilicon etching in accordance with the present invention. Comparison of FIG. 4A and FIG. 4B reveals that bowing has been eliminated almost completely, from −26.62 μm to 0.21 μm.

Figure 4C:
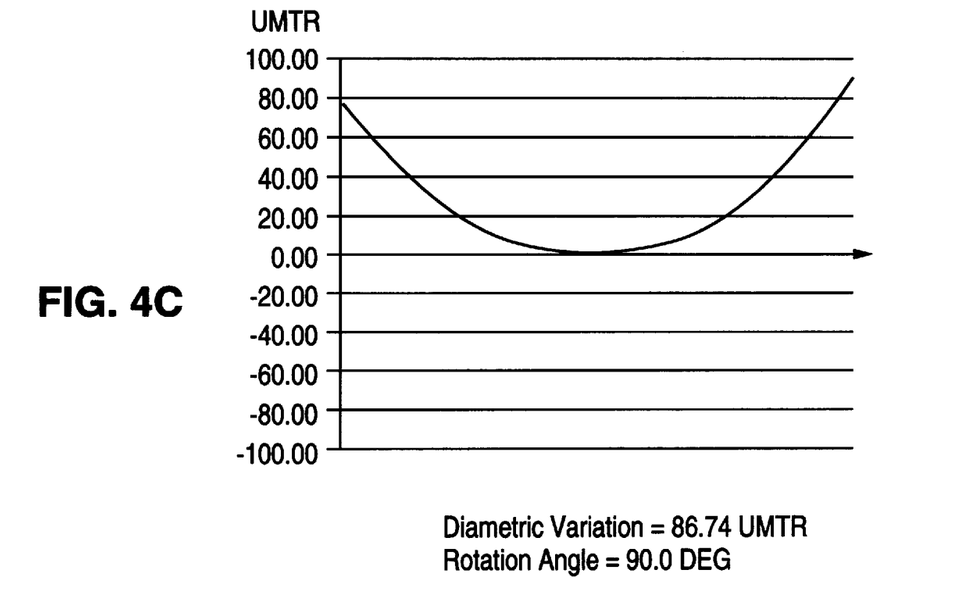
Figure 4D:
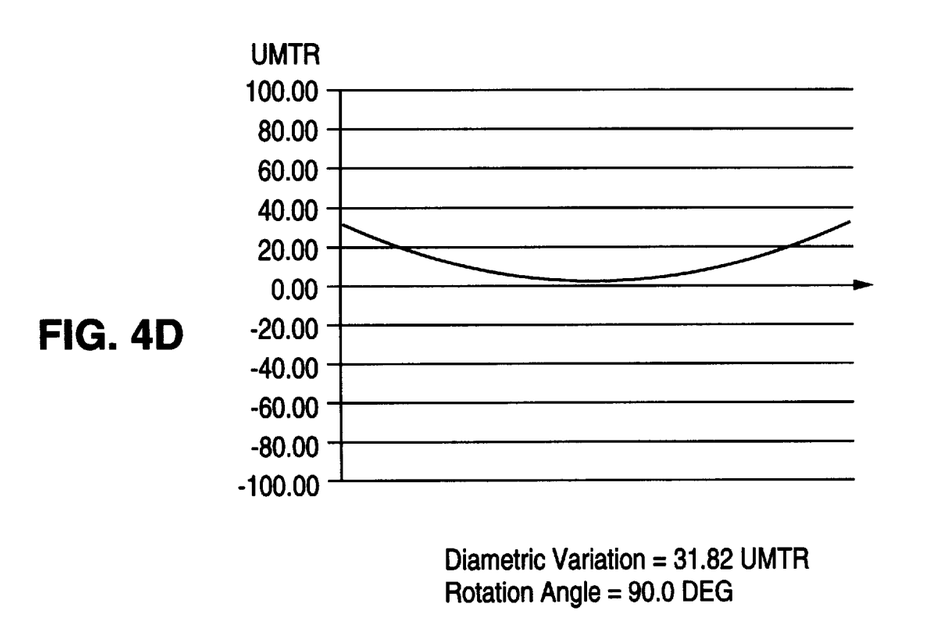

FIG. 4C shows bow measurement of a second wafer prior to backside polysilicon etching in accordance with the present invention. FIG. 4D shows bow measurement of the same lot following backside polysilicon etching in accordance with the present invention. Comparison of FIGS. 4C and 4D reveals that bowing has been substantially reduced from −38.66 μm to −13.98 μm, or by nearly 200%.

Wafer bowing below a threshold of about −20 μm will not ultimately affect reflectance of the light valve. This is because the effect of minor bowing can be compensated for during light valve assembly. Specifically, the center of the top plate can be slightly compressed when sealed against the light valve. The top plate will retain this concave shape due to the vacuum in the cell gap. Where the concave shape of the top plate sufficiently matches bowing in the underlying wafer, the cell gap thickness will be even enough to eliminate fringes.

At the completion of the processing steps shown in FIGS. 3A–3G, the pad etch photoresist layer 314 remains on the front side of wafer 300.

Conventionally, pad etch photoresist layer 314 would then be stripped, and wafer 300 transported for electrical testing (ET) and insertion of liquid crystal material.

However, one embodiment of the process flow in accordance with the present invention leaves the pad etch photoresist mask in place following completion of the backside polysilicon etch. During subsequent wafer transport for electrical testing and LC insertion, this pad etch photoresist mask serves as a passivation layer, protecting the underlying precursor light valve structure from damage.

Moreover, a plasma ash cleaning step is required prior to insertion of LC into the light valve independent of the presence of the pad etch photoresist mask. Therefore, retaining this pad etch photoresist mask in place until insertion of LC material obviates the need to apply a separate plasma ash step that would adversely affect the reflectance of the pixel electrode. In accordance with the present invention, removal of the pad etch photoresist mask is combined with the LC cleaning step, with a process savings of one plasma ash step. Roughness of the pixel electrode should substantially decline in the absence of the extra plasma ash step.

Although the invention has been described above in FIGS. 3A–3G in connection with one specific embodiment of the present invention, it should be understood that the invention as claimed should not be unduly limited to this exact process flow. Various other modifications and alterations in the present invention will be apparent to those skilled in the art without departing from the scope and spirit of the present invention.

For example, while FIGS. 3A–3G show deposition and subsequent removal of only one layer of polysilicon, the process flow in accordance with the present invention is equally applicable to the removal of wafer bowing caused by the deposition of two or more layers of polysilicon. Under these circumstance, backside etching could simply be performed all at once sometime after the final polysilicon deposition step. Alternatively, backside etching could be performed after each polysilicon deposition step. In either case, the oxide coating would need to be etched in order to expose the underlying polysilicon.

Moreover, while the present invention has been discussed above in connection with a process flow that combines backside etching with retention of the pad etching photoresist mask until just before insertion of liquid crystal material, a process flow could incorporate only one of these aspects and still remain within the scope of the present invention.

Therefore, it is intended that the following claims define the scope of the present invention, and that the methods and structures within the scope of these claims and their equivalents be covered hereby.

What is claimed is:

1. A process for fabricating a light valve comprising the steps of:
    forming polysilicon on a front side and a backside of a wafer of semiconducting material;
    etching the polysilicon on the front side of the wafer to create polysilicon elements of a precursor light valve, whereby polysilicon on the backside of the wafer causes a bow in the wafer; and
    removing the polysilicon on the backside of the wafer, whereby the bow in the wafer is substantially eliminated.

2. The process according to claim 1, and wherein the step of removing the polysilicon on the backside of the wafer comprises the steps of:
    grasping an edge of the wafer;
    rotating the wafer; and
    applying an etchant to the backside of the wafer as the wafer is rotating.

3. The process according to claim 2, and wherein the step of applying the etchant includes applying an aqueous mixture of nitric acid and hydrogen fluoride to the backside of the wafer.

4. The process according to claim 2, and wherein the step of removing the polysilicon on the backside of the wafer further comprises the steps of:
    grasping an edge of the wafer;
    rotating the wafer;
    applying a first etchant to the backside of the wafer as the wafer is rotating, such that silicon oxide is removed;
    rinsing the wafer;
    drying the wafer;
    rotating the wafer;
    applying a second etchant to the backside of the wafer as the wafer is rotating, such that polysilicon is removed;
    rinsing the wafer; and
    drying the wafer.

5. The process according to claim 4, and wherein the step of applying the first etchant includes applying an aqueous mixture of hydrogen fluoride to the backside of the wafer, and the step of applying the second etchant includes applying an aqueous mixture of nitric acid and hydrogen fluoride to the backside of the wafer.

6. The process according to claim 1, and further comprising the steps of:
    forming a pad etch photoresist mask on the front side of the wafer after etching the polysilicon on the front side of the wafer; and
    etching regions on the front side of the wafer unmasked by the pad etch photoresist mask to expose pad regions.

7. The process according to claim 6, and wherein the step of removing the polysilicon on the backside of the wafer comprises the steps of:
    grasping an edge of the wafer;
    rotating the wafer; and
    applying an etchant to the backside of the wafer as the wafer is rotating.

8. The process according to claim 7, and wherein the step of applying the etchant includes applying an aqueous mixture of nitric acid and hydrogen fluoride to the backside of the wafer.

9. The process according to claim 7, and wherein the step of removing the polysilicon on the backside of the wafer further comprises the steps of:
    grasping an edge of the wafer;
    rotating the wafer;
    applying a first etchant to the backside of the wafer as the wafer is rotating, such that silicon oxide is removed;
    rinsing the wafer;
    drying the wafer;
    rotating the wafer;
    applying a second etchant to the backside of the wafer as the wafer is rotating, such that polysilicon is removed;
    rinsing the wafer; and
    drying the wafer.

10. The process according to claim 9, and wherein the step of applying the first etchant includes applying an aqueous mixture of hydrogen fluoride to the backside of the wafer, and the step of applying the second etchant includes applying an aqueous mixture of nitric acid and hydrogen fluoride to the backside of the wafer.

11. A process for fabricating a light valve comprising the steps of:
    forming polysilicon on the front side and backside of a wafer;
    etching the polysilicon on the front side of the wafer to create a polysilicon elements of the precursor light valve structure, whereby polysilicon on the backside of the wafer causes a bow in the wafer; and;
    forming a precursor light valve structure on a front side of a semiconductor wafer the precursor light valve structure including a plurality of pixel cells;
    forming a pad etch photoresist mask on the front side of the semiconductor wafer over the precursor light valve structure;
    etching regions of the precursor light valve structure unmasked by the pad etch photoresist mask to form pad regions; and
    removing the polysilicon on the backside of the wafer before removing the pad etch photoresist mask, whereby the bow in the wafer is substantially eliminated;

removing the pad etch photoresist mask immediately prior to inserting liquid crystal material into the precursor light valve structure.

12. The process according to claim 11, and wherein the step of removing the polysilicon on the backside of the wafer comprises the steps of:
   grasping an edge of the wafer;
   rotating the wafer; and
   applying an etchant to the backside of the wafer as the wafer is rotating.

13. The process according to claim 12, and wherein the step of applying the etchant includes applying an aqueous mixture of nitric acid and hydrogen fluoride to the backside of the wafer.

14. The process according to claim 11, and wherein the step of removing the polysilicon on the backside of the wafer further comprises the steps of:
   grasping an edge of the wafer;
   rotating the wafer;
   applying a first etchant to the backside of the wafer as the wafer is rotating, such that silicon oxide is removed;
   rinsing the wafer;
   drying the wafer;
   rotating the wafer;
   applying a second etchant to the backside of the wafer as the wafer is rotating, such that polysilicon is removed;
   rinsing the wafer; and
   drying the wafer.

15. The process according to claim 14, and wherein the step of applying the first etchant includes applying an aqueous mixture of hydrogen fluoride to the backside of the wafer, and the step of applying the second etchant includes applying an aqueous mixture of nitric acid and hydrogen fluoride to the backside of the wafer.

16. In a process for fabricating a light valve comprising the steps of forming polysilicon on a front side and a backside of a wafer of semiconducting material, etching the polysilicon on the front side of the wafer whereby polysilicon on the backside of the wafer causes a bow in the wafer, forming a precursor light valve structure including a plurality of metal pixel electrodes on the front side of the semiconductor wafer, forming a pad etch photoresist mask on the front side of the semiconductor wafer, etching regions of the precursor light valve structure unmasked by the pad etch photoresist mask to form pad regions, removing the pad etch photoresist mask, and inserting liquid crystal material into the precursor light valve structure, the improvement comprising the step of:
   removing the pad etch photoresist mask only immediately prior to inserting liquid crystal material into the precursor light valve structure, such that the pad etch photoresist mask protects the metal pixel electrodes, and such that removing the pad etch photoresist mask cleans the precursor light valve structure.

17. The improved process according to claim 16, and further comprising the step of removing the polysilicon on the backside of the wafer before removing the pad etch photoresist mask, whereby bowing in the wafer is substantially eliminated.

18. The improved process according to claim 17, and wherein the step of removing the polysilicon on the backside of the wafer comprises the steps of:
   grasping an edge of the wafer;
   rotating the wafer; and
   applying an etchant to the backside of the wafer as the wafer is rotating.

19. The improved process according to claim 18, and wherein the step of removing polysilicon on the backside of the wafer further comprises the steps of:
   grasping an edge of the wafer;
   rotating the wafer;
   applying a first etchant to the backside of the wafer as the wafer is rotating, such that silicon oxide is removed;
   rinsing the wafer;
   drying the wafer;
   rotating the wafer;
   applying a second etchant to the backside of the wafer as the wafer is rotating, such that polysilicon is removed;
   rinsing the wafer; and
   drying the wafer.

* * * * *